Feb. 23, 1954 M. E. MOHR 2,670,405

SIGNALING SYSTEM EMPLOYING ELECTRON BEAMS

Filed June 10, 1948 4 Sheets-Sheet 1

INVENTOR
MILTON E. MOHR
BY R. O. Covell
ATTORNEY

Feb. 23, 1954 M. E. MOHR 2,670,405

SIGNALING SYSTEM EMPLOYING ELECTRON BEAMS

Filed June 10, 1948 4 Sheets-Sheet 2

INVENTOR
MILTON E. MOHR
BY R. O. Covell
ATTORNEY

Feb. 23, 1954 M. E. MOHR 2,670,405

SIGNALING SYSTEM EMPLOYING ELECTRON BEAMS

Filed June 10, 1948 4 Sheets-Sheet 3

INVENTOR
MILTON E. MOHR
BY R. O. Covell
ATTORNEY

INVENTOR
MILTON E. MOHR
BY R. O. Covell
ATTORNEY

Patented Feb. 23, 1954

2,670,405

UNITED STATES PATENT OFFICE 2,670,405

SIGNALING SYSTEM EMPLOYING ELECTRON BEAMS

Milton E. Mohr, New Providence, N. J., assignor to Bell Telephone Laboratories, Incorporated, New York, N. Y., a corporation of New York Application June 10, 1948, Serial No. 32,092

8 Claims. (Cl. 179—18)

This invention relates to signaling and to apparatus and a method for controlling a beam of charged particles. It is particularly applicable to cathode ray tubes and to systems employing electron beams to repeat signals.

An object of the invention is to repeat signals with the aid of a cathode ray tube.

Another object of the invention is to provide a system having a plurality of input circuits and a corresponding plurality of output circuits, each output circuit being associated with an input circuit, and means for repeating in a selected output circuit a signal applied to its associated input circuit.

Another object is to repeat in a single output circuit a signal appearing in a selected one of a plurality of input circuits. A converse object is to repeat in a selected one of a plurality of output circuits a signal appearing in a single input circuit.

Another object of the present invention is to provide a commutating system for connecting a single signal source to successive output circuits, or for connecting successive signal sources to a single output circuit.

Another object is to control the position of a beam of a cathode ray tube in accordance with one or more variable voltages.

In one embodiment there is provided a cathode ray tube having at least one target divided into separate parts, either one of which may be struck by the cathode ray beam, and means for applying a potential difference between these parts of the target. A feature of this embodiment is that if the beam is aimed generally toward a target, the potential difference between parts of the target itself determines which part of the target is struck by the beam.

The above-mentioned, as well as other objects, together with the many advantages obtainable by the practice of the present invention, will be readily comprehended by persons skilled in the art by reference to the following detailed description taken in connection with the annexed drawings which respectively describe and illustrate a preferred embodiment of the invention, and wherein:

Fig. 1 is a schematic vertical sectional view taken longitudinally through a cathode ray tube, together with a plurality of signal sources and a corresponding plurality of output circuits respectively associated therewith, the cathode ray tube featuring an array of novel targets and being adapted to repeat in a selected output circuit the signal from its corresponding signal source.

In the drawing, a portion of the tube intermediate its ends has been broken away.

Fig. 1–A is a schematic vertical sectional view taken longitudinally through a portion of a cathode ray tube, featuring a modified target array.

Figure 3:
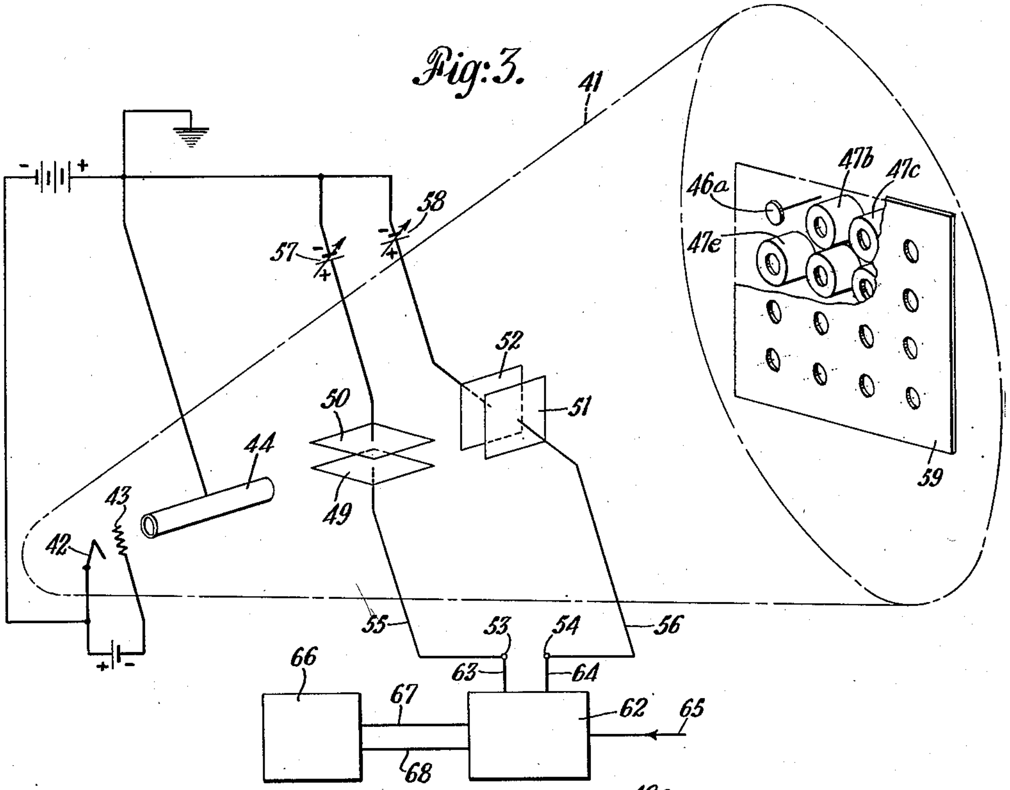
Fig. 3 is a schematic perspective view of a cathode ray tube having a different arrangement of targets, together with certain circuit elements.
Figure 4:
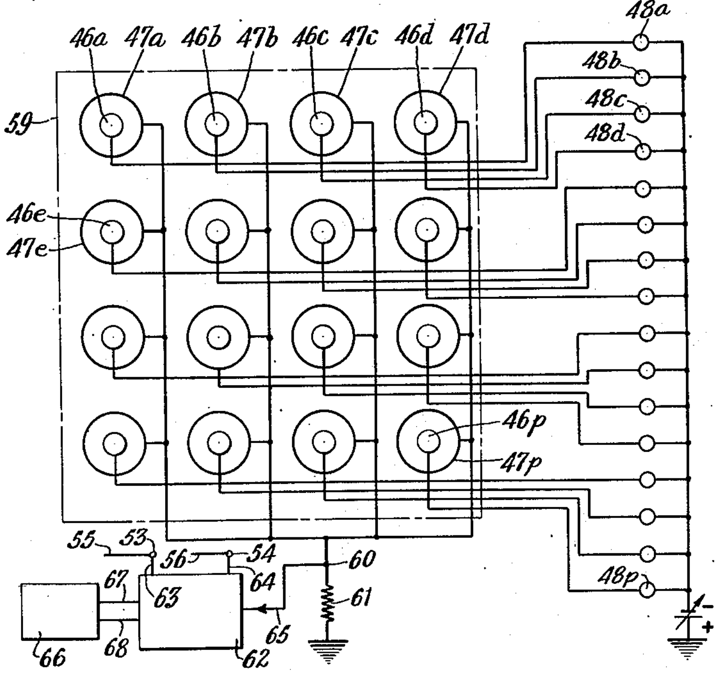

Fig. 4 is a schematic elevational view of a portion of the cathode ray tube shown in Fig. 3, looking along the axis of the tube, toward the target array, the shield plate having been removed. The target array is illustrated in connection with a plurality of signal sources and a single output circuit. Such a system may comprise a portion of an electronic directory in an automatic telephone switching system.

Figure 5:
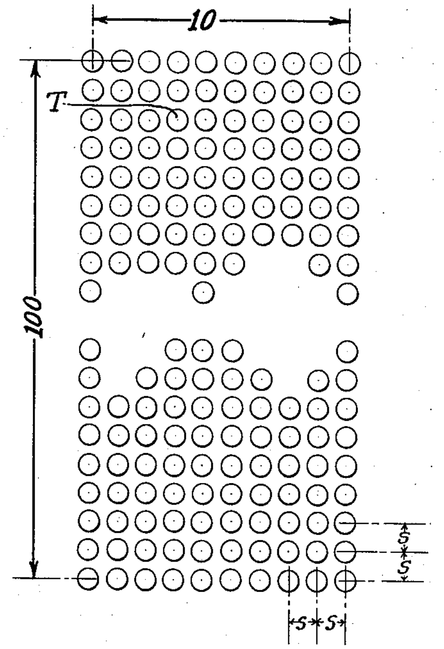

Fig. 5 illustrates schematically an arrangement of targets for a cathode ray tube having 1000 targets instead of only 16 targets as schematically shown in Figs. 3 and 4.

Figure 6:
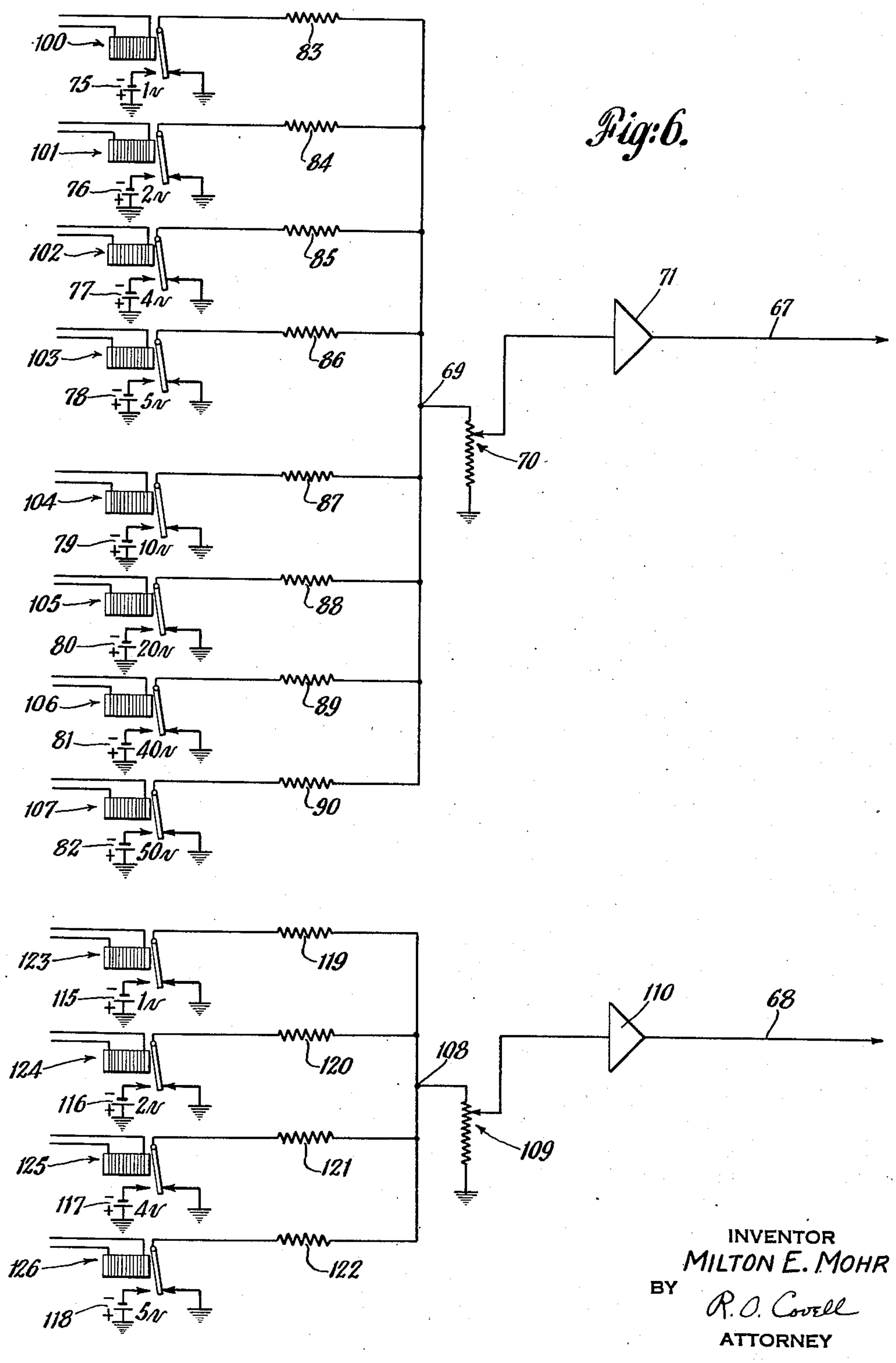

Fig. 6 represents a circuit which may comprise a portion of an automatic telephone switching system adapted to produce deflecting voltages which may be applied to deflecting plates of a cathode ray tube having a target arrangement such as that shown in Fig. 5.

Figure 7:
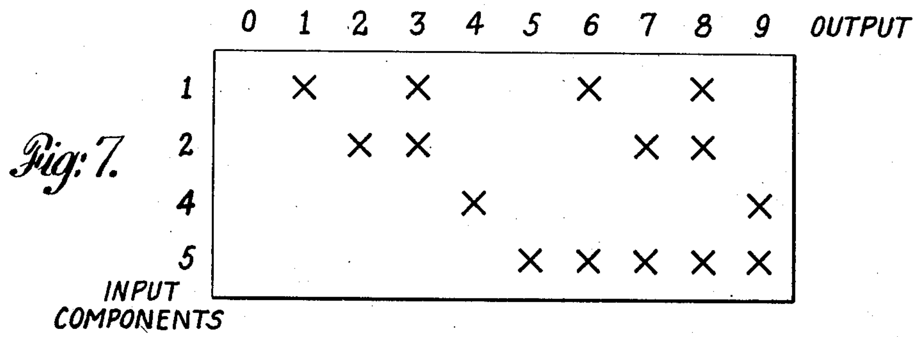

Fig. 7 is a diagram to be referred to in explaining the operation of the circuit of Fig. 6.

Figure 8:
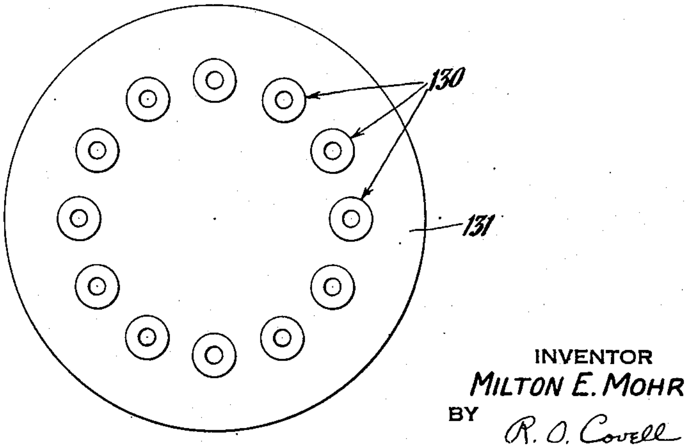

Fig. 8 is a cross-sectional view of a still different embodiment of a cathode ray tube having targets arranged in a circular formation.

In one embodiment there is provided a cathode ray tube having a plurality of targets each divided into a control anode and an output anode, means for impressing varying potential differences between the control and output anodes of the various targets, and means, such as electrostatic deflecting plates or electromagnetic deflecting means, for directing the beam of the tube generally toward a selected target. The control and output anodes are positioned so that either of them may be struck by the beam when it is directed generally toward the target of which they are a part, the one struck, or the extent to which the beam strikes each, depending upon the potential difference between them. Thus if the beam is directed generally toward a first target, and the control anode of this target is at a considerable positive potential with respect to its output anode, the beam will strike the control anode rather than the output anode. If, however, the control anode is, a moment later, at a more negative potential than the output anode, because of a signal impressed on the control anode, the beam will shift to the output anode. When the beam is striking the output anode, this anode will tend to collect electrons, which are allowed to leak off through a load circuit, including a resistor, to ground. If therefore a signal such as a series of negative pulses of potential is applied to the control anode, the beam will, at the appearance of each pulse, be shifted to the output anode, thereby producing a negative pulse at the output anode for each one applied at the control anode. This repeating action at a target takes place only when the beam is aimed generally in the direction of that target, since there is, in the absence of the beam, practically no effective coupling between the control and output anodes of a target. Hence when the beam is aimed at a second selected target instead of at the first, the signal appearing at the control anode of the second target will be repeated at the output anode of that target. The beam may thus be shifted to select first one target and then another so as to cause a signal-repeating action at the momentarily selected target. In some special applications of the device, the beam may be swept through such a path as to select the various targets in succession.

Figures 1, 1A, 2:
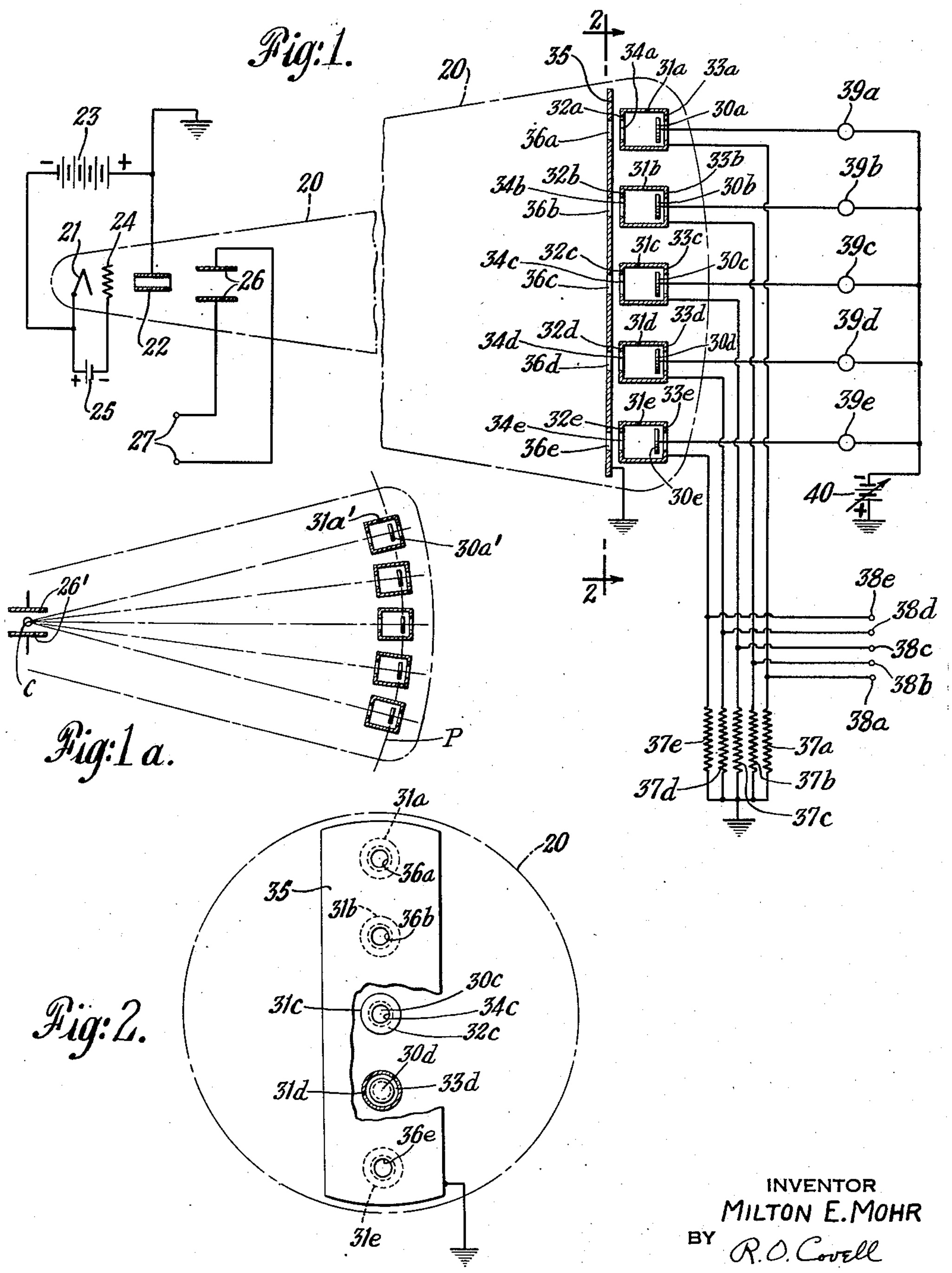
Fig. 2 is a cross-sectional view of the cathode ray tube shown in Fig. 1, certain portions being broken away for clarity of illustration, the position of the section being indicated at 2—2 in that figure.

Reference is now made to Figs. 1 and 2. There is provided a cathode ray tube 20 having beam-forming means including a heated cathode 21, an accelerating anode 22, which may conveniently be at ground potential, a potential source 23 for maintaining the cathode at a negative potential with respect to the accelerating anode, and a grid 24, biased negatively with respect to the cathode by a source 25 of bias potential. The tube is also provided with beam deflecting means adapted to direct the beam generally toward a desired target. This beam deflecting means might be termed a target selector. In the present example such means comprises a pair of electrostatic deflecting plates 26 connected to a pair of control terminals 27. There may be applied to the terminals 27 a beam deflecting voltage for aiming the beam at a selected target. This voltage may satisfactorily be balanced to ground.

It will be understood that for the target selector, instead of using electrostatic beam deflecting means such as the plates 26, electromagnetic deflecting means might be employed.

For convenience in this description, the end of the tube near which the cathode is located may be termed the rear end, and the opposite end of the tube, toward which the beam is directed, may be termed the front or forward end.

The tube is provided, toward its front end, with a plurality of control or input anodes 30*a*, 30*b*, 30*c*, 30*d* and 30*e*, and a corresponding plurality of output anodes 31*a*, 31*b*, 31*c*, 31*d*, and 31*e* respectively adjacent to the control anodes but spaced therefrom. A control anode, such as 30*a*, and its associated output anode, such as 31*a*, may be considered together to comprise a target.

In the illustrated embodiment the control anodes are generally disc-like in shape, with approximately flat faces presented to a beam coming from the deflecting plates. The output anodes are shown as generally in the shape of flanged sleeves positioned so that the beam may pass longitudinally through them and strike the control anodes. Each of the output anodes extends rearwardly from its control anode, that is, toward the left thereof in Fig. 1, and is provided toward its rear end with an inwardly extending flange 32*a*, 32*b*, . . . 32*e*. The output anodes also have a portion extending slightly forwardly of the control anode, terminating in an inwardly extending flange, 33*a*, 33*b*, . . . 33*e*. The flanges 33*a*—33*e* overlap somewhat with the control anodes 30*a*—30*e* so that if the beam should be in such a position that certain of its electrons just miss the edge of a control anode, for example, 30*a*, they will strike the flange 33*a* of the associated output anode. It will be understood that this flange, and other parts of the output anode, are electrically insulated from the control anode, so that a potential difference may be impressed between them. The rear flanges 32*a*—32*e* toward the left-hand end of the output anodes are provided with central openings 34*a*—34*e* through which the beam may pass.

In case the control anode 30*a* is at a negative potential with respect to its output anode 31*a*, the electrons comprising the beam will, after entering the sleeve-like output anode 31*a*, tend to be deflected away from the control anode. The control anodes may in some cases be referred to as electron deflectors. If the control anode 30*a* is only slightly negative with respect to the output anode, a portion of the beam may pass by the edge of the control anode and strike the flange 33*a*. If a more strongly negative potential is applied to the control anode 30*a*, a considerable portion of the beam may strike the longitudinal sleeve-like portion of the output anode 31*a*. If the control anode 30*a* is driven very strongly negative with respect to the output anode 33*a*, a portion of the beam may tend actually to reverse in direction, after entering the sleeve-like output anode, and the flange 32*a* of the output anode is helpful in intercepting electrons which travel along such a reversing path.

The control anode 30*a*, in diverting the electrons toward the output anode, may tend to disperse the beam, causing the electrons to spread apart instead of remaining a beam of small cross section. Hence the control anodes may in some cases be referred to as beam-dispersing means. It will be noted that the generally enclosed configuration of the output anode also is adapted to provide a sort of shielding action, so that electrostatic fields generated between the anodes of one of the targets, do not have too great an effect in other portions of the tube, such as in regions near other targets.

In Figs. 1 and 2, as well as in Figs. 3, 4, 5 and 8, yet to be discussed, for simplicity of illustration the axes of the output anodes have been shown as parallel to the axis of the tube, and the control anodes have been shown as lying in a plane perpendicular to the axis of the tube. It will be understood, however, that, particularly if a tube geometry is employed such that the array of targets intercepts a large angle at the deflecting plates, the axes of the sleeve-like output anodes, instead of being exactly parallel to the axis of the tube, should converge toward the deflecting plates, in order that the beam may pass longitudinally through the output anode of the selected target and strike approximately the center of the associated control anode. The control anodes would each be perpendicular to the axis of its associated output anode, and if, as mentioned, the axes of the output anodes converge toward the deflecting plates, and the control anodes are perpendicular to these axes, respectively, the control anodes may satisfactorily be approximately tangential to a spherical surface centered in a point in the vicinity of the deflecting plates. Such a configuration is schematically illustrated in Fig. 1–A. In this figure, deflecting plates are indicated as 26'. The midpoint C of the deflecting plates is the center of a spherical surface P. Control anodes, one of which is indicated as 30$a'$, are tangential to this surface and sleeve-like output anodes, one of which is indicated as 31$a'$, are arranged with their axes converging at the point C.

Referring again to Figs. 1 and 2, there is provided, just to the rear of the targets, that is, between the targets and the cathode, near the targets, a shield 35 of electrically conducting material, provided with openings 36*a*—36*e*, positioned to coincide generally with the openings 34*a*—34*e* in the rear flanges of the output targets. The purpose of the shield 35 is to prevent variations in potentials of various targets from affecting the beam significantly during its transit through the tube before it reaches the region of the targets.

In the embodiment shown in Fig. 1, each of the output anodes, 31*a*—31*e*, is provided with an output circuit including a load resistor, 37*a*—37*e*, respectively, connected between the output anode and ground. The ungrounded ends of the load resistors 37*a*—37*e* are connected to a series of output terminals, 38*a*—38*e*, respectively.

A plurality of signal sources 39*a*—39*e* are respectively connected to the control anodes 30*a*—30*e* and to the negative terminal of an adjustable source 40 of direct current bias potential, the positive terminal of which is grounded.

Thus the signals from the sources 39*a*—39*e* are applied in series with the bias voltage from the direct current source 40. The source 40 may, in some modes of operation, be adjusted to maintain the control anodes at a sufficiently negative potential that when the value of the signal applied is zero, a portion of the beam will strike the output anode of the selected target and a portion will strike the control anode. When the control anode is driven to a more negative potential, a larger proportion of the beam will strike the output anode. When the signal from the source is a small positive one, the control anode assumes a less negative potential, and a smaller proportion of the beam will strike the output anode, a greater proportion striking the control anode. When the control anode is driven very strongly positive, practically none of the beam will strike the output anode. When the control anode is driven very strongly negative, practically all the beam will strike the output anode. The reason for employing the bias source 40, in embodiments in which it is employed, is that without this bias practically none of the beam would strike the output anode when the signal is zero, and therefore a positive portion of a signal, elevating the potential of the control anode with respect to the output anode, would produce the same response at the output anode as would be produced by zero signal. Consequently, in the absence of a bias, there may be a sort of rectifying action, in which the positive portion of the applied signal is clipped.

In certain cases, the bias may satisfactorily be omitted. For example, a series of negative pulses having steep leading and trailing edges may satisfactorily be repeated without the use of bias, particularly if it is the spacing of the pulses which is important, rather than their amplitude. In the absence of a pulse, none of the beam will reach the output anode, but during a negative pulse all the beam will be directed to the output anode.

The device shown in Figs. 1 and 2 may be operated as follows. It may be assumed that it is desired to apply to a selected output terminal, such as 38*a*, the signal supplied by its associated signal source 39*a*. This signal may, for example, comprise a series of voltage pulses. For the sake of the present illustration it will be assumed that the signal is of the pulse-position-modulation type, sometimes referred to as of the pulse-time-modulation type, in which there is periodically transmitted a reference pulse and a second pulse delayed by a variable interval from the reference pulse. It may be assumed that the pulses applied to the control anodes are of negative polarity. It may further be assumed that the pulses are of sufficient amplitude to shift the beam substantially from the control anode to the output anode. A zero bias may be used.

A direct current voltage is applied to the deflecting plates 26 through terminals 27, of proper magnitude and polarity to direct the beam toward the target to which the selected output terminal is connected, in the present example, toward the target comprising the control anode 30*a* and the output anode 31*a*. During moments when the signal is positive the beam will strike the control anode 30*a* and virtually none of the beam will strike the output anode 31*a*. During moments when a negative pulse is impressed on the control anode 30*a*, virtually all of the beam will be caused to strike the output anode 31*a* because this anode will be more positive than the control anode. Thus if the signal applied to the anode 30*a* comprises a voltage which is normally slightly positive, and includes a series of negative pulses, the beam will normally be attracted to the control anode and will be caused intermittently to swing over to the output anode 31*a*. During the moment when the beam is striking this output anode, the electron beam will cause negative charge to collect on the output anode, thereby causing a flow of electrons through the load resistor 37*a*. As a result of the intermittent current pulses through the load resistor as the beam swings to and away from the output anode 31*a*, there will appear at the output terminal 38*a* a series of negative voltage pulses, thereby repeating the signal applied by the signal source 39*a*. It will thus be seen that by aiming the beam generally toward a selected target it is possible to apply to a selected output terminal a signal corresponding to that supplied by its associated signal source.

It will be noted that in the illustrated embodiment the output anode and the control anode which together comprise a target are so positioned that the beam may strike either of these anodes, depending upon the potential difference between them. This arrangement is to be distinguished from an arrangement in which the means which deflect the beam are entirely separate from the target, and are themselves not struck by the beam.

Another feature to be noted is that in the illustrated embodiments the control anodes are actually farther from the cathode than are the output anodes. Stated differently, there is provided a cathode ray tube comprising a source of a beam of electrons, an output anode, and an electron-deflector located at least as far from said source as is said output anode, or farther.

Reference is made to Figs. 3 and 4. There is shown a cathode ray tube 41 having a cathode 42, a grid 43, an accelerating anode 44, and suitable sources of bias potential for maintaining the grid negative with respect to the cathode and the cathode negative with respect to the accelerating anode. The accelerating anode may be grounded. The cathode ray tube 41 has an array of targets which individually are generally of the type heretofore described, but which are in the present embodiment arranged in a matrix instead of in a straight line. Each target is divided into an input or control anode, and an output anode, the control anodes being designated by the reference numerals 46*a*, 46*b*, 46*c*, . . . 46*p*, and the output anodes being designated by the reference numerals 47*a*, 47*b*, 47*c*, . . . 47*p*, anodes represented by reference numerals having like subscripts being associated together to comprise a target. That is, control anode 46*a* and output anode 47*a* together form a target; control anode 46*b* and output anode 47*b* form another target, and so on. Preferably the targets are arranged with the axes of the output anodes converging in the direction from which the beam comes, so as to receive the beam more readily, as was previously explained in connection with Fig. 1–A.

Each of the targets is provided with an input circuit including a source of signals. Signal sources, 48*a*—48*p*, are connected to the control anodes 46*a*—46*p*, respectively.

There is provided a beam deflector adapted to aim the beam generally toward any selected target. This beam deflector may comprise a pair of horizontal plates 49 and 50, for controlling the vertical position of the beam, and a pair of vertical plates 51 and 52 for controlling the horizontal position of the beam. The plates 50 and 52 may be maintained at constant direct current potentials during operation of the device, and hence the position of the beam may be controlled by applying control potentials to the plates 49 and 51 through terminals 53 and 54, which are respectively connected to the plates 49 and 51 through leads 55 and 56. For applying constant potentials to the plates 50 and 52, there may be provided adjustable bias sources 57 and 58 respectively, having one terminal grounded and the other terminal connected to the deflecting plates. Thus these bias sources may conveniently be arranged to apply to the plates 50 and 52 positive potentials of such value that when the plates 49 and 51 are at ground or some other reference potential, the beam will rest on the upper left-hand target comprising the anodes 46*a* and 47*a*.

It will be understood that instead of the arrangement shown, the circuit may be arranged so that the deflecting voltages for both the horizontal and vertical plates may be balanced to ground.

Just to the rear of the targets, there is provided a shield 59. If the targets are located around a spherical surface in the general arrangement shown in Fig. 1–A, the shield is preferably spherical and concentric with the first-mentioned spherical surface.

The output anodes are in the embodiment shown in Fig. 4 connected to a common point 60, between which point and ground there is connected a load resistor 61.

It may therefore be seen that if the beam is aimed generally in the direction of one of the targets, there will be repeated at the point 60 the signal from the source connected to the control anode of the selected target.

If the beam should be swept across the targets in succession, then the system described thus far would be in the nature of a commutator, serving to apply to the common output point 60 signals from successive sources 48*a*—48*p*.

A cathode ray tube of the type shown in Figs. 3 and 4 may conveniently be used as a part of an automatic directory for a telephone switching system. It may be assumed that when a subscriber calls the number of another subscriber, it is desired to obtain certain information regarding the line of the called subscriber, such as whether this line is busy, or to obtain certain information from one or more trunks. Depending upon the information obtained, certain switching operations will thereafter be performed.

In using the cathode ray tube of the type shown in Figs. 3 and 4 in such a switching system, the signal sources 48*a*—48*p* may represent the various trunks or lines to be called, connected to the various control anodes 46*a*—46*p*, and there may be available from these lines signals of practically any type, such as FM, AM, pulse time modulation, and the like, corresponding to the information desired. There may be provided a sender 62, one of the general purposes of which is to investigate a desired line and to perform switching operations depending upon information received from that line. In the present system the sender 62 is connected by leads 63 and 64 to the terminals 53 and 54 which control the position of the beam of the cathode ray tube 41, and is adapted to apply to these terminals such a combination of direct current potentials as will point the beam at the target to which the desired line is connected. The common output point 60 for the targets is connected by a lead 65 to the sender 62, for returning the desired information to the sender.

To determine the line called by the sender, there is provided control means 66 which may be termed a sender-controller, connected to the sender 62 by leads 67 and 68. The sender-controller comprises apparatus responsive to signals from a calling subscriber's station, or to other control elements, adapted to cause the sender to call a particular line. The sender-controller applies control potentials to the sender through the leads 67 and 68, and in response thereto the sender applies suitable control potentials to the terminals 53 and 54 to point the beam at the target to which the called line is connected.

For simplicity of description, it may be assumed that a direct current control potential with respect to ground is applied by the sender-controller 66 through the lead 67 to the sender 62 and is merely repeated by the sender, and applied as a control potential of the same value through the lead 63 to the terminal 53, for controlling the vertical position of the beam.

It may likewise be assumed that a direct current control potential is applied through the lead 68 to the sender 62 and is repeated by the sender, being applied as a control potential of the same value to the terminal 54 through the lead 64, for controlling the horizontal position of the beam.

As will be explained, in order to produce a suitable potential at, for example, the lead 67, for controlling the vertical position of the beam, the sender-controller 66 is, in one embodiment, provided with a series of potential sources of different values, an adding circuit, a series of switches for applying selected combinations of potentials from said sources to said adding circuit for producing a sum potential which appears at the lead 67, and means for selectively actuating one or more of said switches to produce a sum potential of the desired value. For producing the control potential at the lead 68, in order to control the horizontal position of the beam, there is provided another adding circuit, together with an associated series of potential sources, a series of switches, and means for selectively actuating the switches. The means for selectively actuating the switches may, for example, comprise a series of relays. Suitable means are provided for energizing combinations of these relays in accordance with the line called. Thus for example when the subscriber dials a particular number, his instrument may transmit a series of voltage pulses, which by suitable means may be caused to energize a corresponding combination of relays. Such last-mentioned means will be understood by those skilled in the art, and therefore need not be described in detail. In the subsequent description of the sender-controller, only the relays and the elements responsive thereto will be discussed in detail, since it will be assumed that suitable means for energizing combinations of these relays are provided, either as a part of the sender-controller, or as a part of means for controlling same.

If a cathode ray tube of the general type shown in Figs. 3 and 4 is to be used as a portion of an automatic telephone switching system, a large number of targets may be desirable. Thus instead of employing 16 targets as shown in Figs. 3 and 4, there may be employed, say, 1000 targets, arranged in a matrix, as is schematically illustrated in Fig. 5. It will be understood that the array in Fig. 5 comprises a matrix arrangement having 100 horizontal rows of targets and 10 vertical columns.

Fig. 6 may now be referred to for description of circuit means which may comprise a part of the sender-controller 66, adapted to produce in the leads 67 and 68 a pair of direct current control voltages which, when repeated by the sender 62 and applied to the horizontal and vertical deflecting plates, respectively, of a cathode ray tube having an array of targets such as that shown in Fig. 5, will point the beam at a selected target.

It may be assumed that bias voltages are applied to the deflecting plates 50 and 52 respectively by the sources 57 and 58, of such value as normally to position the beam on the target in the extreme upper left-hand corner of the array, when the potentials applied to the plates 49 and 51 are each zero or some other reference potential corresponding to a normal or undeflected condition. It may be assumed in the illustrated embodiment that the targets are uniformly spaced throughout a given row or column, and that the horizontal spacing is equal to the vertical spacing. If the center-to-center separation of the targets in the horizontal direction and also in the vertical direction is represented by the symbol S, then to move the beam from its normal position, on the upper left-hand target, to, say, the target T in the fourth vertical column and the third horizontal row, it is necessary to shift the beam a distance 3S to the right and a distance 2S downwardly.

The voltage increment in the lead 67 to produce a vertical displacement of S or in the lead 68 to produce a horizontal displacement of S may be represented by the symbol V, and it may be seen that to shift the beam from its normal position to the target T, there should be produced a voltage increment of 2 v. in the lead 67 and a voltage increment of 3 v. in the lead 68. In order to deflect the beam to the right and downwardly, these potential changes should be in the positive direction, assuming that there is no reversal of polarity within the sender 62 between the lead 67 and the lead 63, or between the lead 68 and the lead 64.

As shown in Fig. 6, in order to produce in the leads 67 and 68 control potentials of the desired values, there is provided, for each of the leads, a series of potential sources of different values, an adding circuit having an input terminal for each of said potential sources and an output terminal, and means for selectively connecting one or more of said potential sources to said adding circuit to produce at said output terminal a resulting or sum potential. The sum potential is controllable in steps, depending upon the combination of potential sources connected to the adding circuit.

*Adding circuit for producing vertical deflection of beam*

The output terminal of the adding circuit associated with the lead 67 may be considered to be a point 69, which is coupled to the lead 67 by direct current responsive circuit means comprising a potentiometer 70 and an amplifier 71. Potential changes in the lead 67 will be proportional to potential changes at the point 69 but in the opposite direction, assuming that the amplifier 71 comprises one stage. That is, a decrease in potential at the point 69 will produce a proportionate increase in the potential of the lead 67. The proportionality factor may be initially adjusted by adjustment of the potentiometer 70. During actual operation of the device, no further adjustment of this potentiometer is necessary.

For the lead 67 there is provided a first group of four potential sources 75, 76, 77 and 78, having values of 1, 2, 4 and 5 volts respectively, and a second group of four potential sources, 79, 80, 81 and 82, having values of 10, 20, 40 and 50 volts, respectively. With the arrangement shown, these potential sources should have their positive terminals grounded and their negative terminals adapted to be connected to the adding circuit to be described. It will be understood that while the potential sources 75—82 need not necessarily have the exact values given, they should have values proportional to the values given. The adding circuit for the lead 67 comprises eight equal resistors 83—90, inclusive, one end of each of said resistors being connected to the common output point 69, the other or input ends of the resistors being respectively connected to the contact arms of a series of relays 100—107, adapted, when energized, to connect the resistors 83—90 to the respective potential sources 75—82. When not energized, these relays are adapted to ground the input ends of the respective resistors 83—90.

The adding circuit including the resistors 83—90 together with the associated potential sources and relays, is adapted to produce at the output terminal 69 of the adding circuit a negative potential proportional to the sum of the various potentials applied to its input terminals. This sum may be any number from 0 to 99, inclusive, depending upon which of the relays 75—82, or combinations of same, are actuated. There consequently may be produced in the lead 67 a voltage increment of $n$V, where $n$ is any integer from 0 to 99, inclusive, and V is, as previously defined, the potential increment required to deflect the beam from one target to the next. The principles of operation of the adding circuit described will be understood by those skilled in the art, and need not be discussed in detail. It will suffice to illustrate with one or two specific examples.

If it is desired to produce in the lead 67 a voltage increment of 2 v., only the relay 76 will be energized, thereby connecting the 2-volt potential source to the input end of the resistor 84.

As another example, if it is desired to produce in the lead 67 a voltage increment of 8 v., the relays 75, 76 and 78 will be energized, connecting the 1-, 2- and 5-volt potential sources to their associated resistors.

Reference is made to Fig. 7. This diagram illustrates different combinations of sources 75—78 of potential which should be applied to the input ends of the resistors of the adding circuit of Fig. 6 in order to produce a desired potential. Shown vertically along the left-hand side of the diagram are the voltages, or relative potentials, of input potential sources, such as 75—78. Shown horizontally along the top of the diagram, on a dimensionless scale, are the potentials which it is desired to derive. The potential appearing at the point 69 as a result of connecting combinations of the sources 75—78 to the adding circuit will be proportional to the numbers along the top of the diagram in Fig. 7, and the increment in the potential in lead 67 will be V multiplied by the number indicated in this scale. The X marks shown under the various numerals at the top indicate the combinations of input sources which should be connected to the adding circuit in order to obtain the potential increment in question. Thus, for example, under 8, which indicates a potential increment of 8 v. in the lead 67, there are X marks indicating that the 1-volt, 2-volt, and 5-volt potential sources should be connected to the adding circuit. The diagram in Fig. 7 will indicate other combinations necessary in order to obtain a voltage increment of from zero to 9 v.

The potential sources 79, 80, 81 and 82, having values of 10, 20, 40 and 50 volts, when used in combination with the potential sources 75—76, make it possible to obtain an increment of from zero to 99 v. in the lead 67.

*Adding circuit for producing horizontal deflection of beam*

The output terminal of the adding circuit associated with the lead 68 may be considered to be a point 108 which is coupled to the lead 68 by direct current responsive circuits means comprising a potentiometer 109 and an amplifier 110. Potential changes in the lead 68 will be proportional to potentials at the point 108 but in the opposite direction, assuming that the amplifier 110 comprises one stage. That is, a decrease in potential at the point 108 will produce a proportionate increase in the potential of the lead 68. The proportionality factor may be initially adjusted by adjustment of the potentiometer 109, no further adjustment being thereafter necessary.

For producing the desired changes in potential at the point 108 and in the lead 68, there are provided four negative potential sources 115, 116, 117 and 118, having values of 1, 2, 4 and 5 volts, respectively, and an adding circuit comprises four equal resistors 119, 120, 121 and 122. One end of each of these resistors is connected to the common output point 108, the other or input ends of the resistors being respectively connected to the contact arms of a series of relays 123, 124, 125 and 126 adapted, when energized, to connect the input ends of the resistors 119—122 to the respective potential sources 115—118. When not energized, these relays are adapted to ground the input ends of these resistors.

The operation of the adding circuit for the lead 68, together with its associated relays and potential sources, is generally similar to the operation of the adding circuit associated with the lead 67, except that potential changes of from zero to 9 v. may be produced in the lead 68, while potential changes of from zero to 99 v. may be produced in the lead 67.

As has previously been stated, the potential of the lead 67 controls the downward or vertical deflection of the beam, and the potential of the lead 68 controls the deflection of the beam toward the right, horizontally. With an array of targets such as that shown in Fig. 5, having 10 vertical columns and 100 horizontal rows, in order to position the beam on any of the 1000 targets, it is necessary to be able to apply to the lead 68 a voltage increment of from zero to 9 v., and to be able to apply to the lead 67 a voltage increment of from zero to 99 v. It may be seen from the previous description of the circuit elements of Fig. 6, that such a system is capable of positioning the beam on any of the 1000 targets, since it is capable of applying such increments to the leads 67 and 68.

The 1000 targets of Fig. 5 may be considered to correspond to 1000 lines which it may be desired to call. When a calling subscriber calls a desired line, a selected combination of the relays shown in Fig. 6 will be energized, by means not shown, thereby causing the beam to be pointed at the target corresponding to the desired line. Information from that line will then be repeated at the point 60 of Fig. 4, and fed back through the lead 65 to the sender 62. The sender will thereafter perform any necessary switching operations.

The usefulness of the device of the present invention as a commutator has heretofore been described. In such an application, it may be desired to sweep the beam continuously over successive targets. A target arrangement which is advantageous for such an application is shown in Fig. 8. In this arrangement the targets 130 are disposed in a circular array, conveniently concentric with the axis of a cathode ray tube 131, and the beam may be given a circular scanning motion, thereby causing it to sweep over successive targets. One advantage of such an array is that the beam may move at uniform speed and will sweep over successive targets at uniform intervals, as distinguished from an arrangement in which the targets are in one or more straight lines, in which case the beam must perform a recovery motion at a very rapid rate, if the targets are to be swept over at uniform intervals.

It will be understood that there has been disclosed herein a novel method as well as novel apparatus. Thus, for example, there has been disclosed a method of repeating a signal potential with the aid of an electron beam, comprising directing said beam of electrons toward a control electrode, applying said signal potential to said control electrode to disperse said beam and to deflect said electrons away from said electrode to an extent instantaneously determined by the amplitude and polarity of said signal, and collecting the electrons deflected by said electrode. In some embodiments, the signal potential applied to the electrode may be sufficiently negative at times that the electrons are driven not only outwardly from the axis of the beam but generally backwardly toward the source of the beam. That is, they are given a component of movement in a direction the reverse of that of the beam. The electrons may be collected at a point nearer the source of the beam than the control electrode.

In one embodiment, the method of the present invention is useful in selectively repeating a plurality of signals. This may be accomplished by generating a deflectable electron beam, selectively aiming the beam at one of a plurality of zones, applying to said plurality of zones, respectively, time-varying signal potentials sufficiently negative at moments to repel electrons of said beam from said zones, and collecting the repelled electrons.

Where the present specification and claims refer to methods and apparatus for repeating signals, it will be understood that it is intended to include not only repeating systems in which the output signal is a faithful reproduction of the input signal, but systems in which the output signal is determined by, but is not exactly proportional to, the input signal.

The teachings of the present invention are applicable not only to beams of electrons, but to beams of other types of charged particles.

While a suitable form of apparatus and mode of procedure, to be used in accordance with the invention, have been described in some detail, and certain modifications have been suggested, it will be understood that numerous changes may be made without departing from the general principles and scope of the invention.

What is claimed is:

1. In a cathode ray tube having beam forming and directing means, a plurality of pairs of anodes, one anode of each pair being a sleeve-like output anode and the other being a control anode located at the far end and within the output anode of the pair, said pairs of anodes being positioned so that the beam may be directed lengthwise through any one of said output anodes toward the control anode therein, and means including connections individual to each said pair of anodes for applying a difference of potential between the anodes of the pair to cause the beam to strike a selected one of said pair of anodes.

2. A cathode ray tube commutator comprising a plurality of targets, each divided into separate anodes, a plurality of input circuits respectively connected to one anode of each target, a plurality of output circuits respectively connected to another anode of each target, deflecting means adapted to point the beam of the tube toward successive targets, and means for applying a plurality of signals to said respective input circuits.

3. A signaling system comprising input circuit means, output circuit means, control circuit means, and a cathode beam tube comprising a plurality of pairs of anodes, one anode of each of said pairs being connected to said input circuit means, the other anode of each of said pairs being connected to said output circuit means, and beam forming and deflecting means responsive to said control circuit means adapted to direct the beam toward a selected pair of said anodes, the anodes of each pair being positioned so that said beam may strike either anode depending upon their relative electrical potentials, said control circuit means comprising connections for a series of potential sources of different values, an adding circuit, a series of switches for applying selected combinations of potentials from said sources to said adding circuit for producing a sum potential, connections for applying said sum potential to said beam-deflecting means, and means for selectively actuating one or more of said switches, to apply such a sum potential to said beam deflecting means as to aim said beam at a selected pair of anodes.

4. In an automatic telephone switching system, a cathode ray tube having beam-producing means, a plurality of targets each divided into a control anode and an output anode, deflecting means adapted to direct the beam generally toward a selected target, a plurality of circuits respectively connected to said control anodes and adapted to apply thereto signal potentials to shift the beam from one of said anodes of the selected target to the other, thereby repeating at the ouput anode of the selected target the signal applied to its control anode, a plurality of switches, means for actuating a selected combination of said switches corresponding to a particular circuit which it is desired to call, and means responsive to said switches adapted to cause said deflecting means to direct said beam generally toward a selected target.

5. In a telephone exchange system, a cathode ray tube having beam-producing means, a plurality of targets each divided into a control anode and an output anode, deflecting means adapted to direct the beam generally toward a selected target, a plurality of lines respectively connected to said control anodes and adapted to apply thereto signal potentials to shift the beam from one of said anodes of the selected target to the other, thereby repeating at the output anode of the selected target the signal applied to its control anode, a sender adapted to cause said deflecting means to direct said beam generally toward a selected target corresponding to a line from which information is desired, and circuit means connecting said output anodes to said sender.

6. In combination, means for propelling a beam of charged particles passing through an aiming zone, an aimer adapted to impress a field on said zone to aim said beam along a selected one of several diverging paths, several output electrodes each having a portion parallel to and surrounding one of said paths, a repeller electrode within each of said output electrodes biased relative to its output electrode with the same polarity as the charge on said particles, and means for individually applying signal potentials to said repeller electrodes relative to their output electrodes.

7. A method of repeating signals involving the use of an electron beam and an electrode, said method comprising directing said beam of electrons toward said electrode, applying to said electrode a varying input signal potential sufficiently negative at times to disperse said beam and to repel said electrons from said electrode with a component of movement in a direction the reverse of that of said beam, collecting said repelled electrons, thereby accumulating a charge dependent upon variations in said signal potential, and continuously discharging said collected electrons to derive an output signal potential dependent upon said input signal potential.

8. In a communication system including a plurality of circuits which may be called, each of said circuits being identified by a plurality of reference characters, a method of selectively repeating at an output point a signal potential appearing in a called circuit, comprising applying signal potentials from said circuits to a plurality of corresponding control zones, respectively; adding a combination of potentials individually corresponding to the reference characters of a called circuit, thereby deriving a sum potential corresponding to said called circuit, generating a beam of electrons and directing said beam through an aiming region; establishing in said region, with the aid of said sum potential, a deflecting field to aim said beam of electrons toward the control zone to which the signal potential of said called circuit is applied, said signal potentials being at times sufficiently negative to repel said electrons from said last-mentioned zone; collecting said repelled electrons, thereby deriving an output signal; and applying said output signal to said output point.

MILTON E. MOHR.

References Cited in the file of this patent

UNITED STATES PATENTS

| Number | Name | Date |
|---|---|---|
| 2,122,316 | Bowie | Sept. 5, 1939 |
| 2,172,728 | Bruche | Sept. 12, 1939 |
| 2,204,055 | Skellett | June 11, 1940 |
| 2,212,645 | Morton | Aug. 27, 1940 |
| 2,224,677 | Hanscom | Dec. 10, 1940 |
| 2,250,528 | Gray | July 29, 1941 |
| 2,290,587 | Goldstine | July 21, 1942 |
| 2,301,748 | Renshaw | Nov. 10, 1942 |
| 2,361,766 | Hadekel | Oct. 31, 1944 |
| 2,379,221 | Espenshied | June 26, 1945 |
| 2,395,299 | Skellett | Feb. 19, 1946 |
| 2,401,740 | Kilgore | June 11, 1946 |
| 2,425,657 | Tunick | Aug. 12, 1947 |
| 2,452,157 | Sears | Oct. 26, 1948 |
| 2,462,896 | Ransom | Mar. 1, 1949 |
| 2,477,008 | Rosen | July 26, 1949 |
| 2,521,255 | Rusterholz | Sept. 5, 1950 |